(12) United States Patent
Stevenson et al.

(10) Patent No.: US 7,832,074 B2
(45) Date of Patent: Nov. 16, 2010

(54) METHOD FOR INSTALLATION OF BLIND RIVETS

(75) Inventors: Robin Stevenson, Bloomfield, MI (US); Roland J. Menassa, Macomb, MI (US); Pei-Chung Wang, Troy, MI (US); Ugur Ersoy, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1195 days.

(21) Appl. No.: 11/440,508

(22) Filed: May 25, 2006

(65) Prior Publication Data
US 2007/0271764 A1 Nov. 29, 2007

(51) Int. Cl.
*B21J 15/02* (2006.01)
(52) U.S. Cl. ............. 29/407.01; 29/407.05; 29/407.1; 29/524.1; 29/525.06; 29/715; 29/718; 29/243.521
(58) Field of Classification Search ............. 29/407.01, 29/407.05, 407.09, 407.1, 524.1, 525.06, 29/715, 716, 718, 243.521
See application file for complete search history.

(56) References Cited

U.S. PATENT DOCUMENTS 2,371,452 A * 3/1945 Lees, Jr. .............. 411/501
7,024,746 B2 * 4/2006 Weeks et al. ............. 29/407.08
2006/0024145 A1 2/2006 Wang et al.

OTHER PUBLICATIONS

U.S. Appl. No. 11/341,539, filed Jan. 27, 2006, Wang et al.

* cited by examiner

*Primary Examiner*—Jermie E Cozart

(57) ABSTRACT

Method and apparatus is provided for monitoring the installation of a blind rivet to attach together top and bottom members. The blind rivet installation tool includes a housing having an anvil seated on the rivet head. A collet is reciprocable within the tool housing and carries jaws for gripping the mandrel of the blind rivet. Retraction of the jaws by the collet displaces the jaws and the mandrel axially and causes the mandrel head to axially collapse and radially expand the hollow shank of the blind rivet into engagement with the bottom member so that the rivet attaches the top member and the bottom member. A cut off tool is actuated by an actuator to cut off the mandrel flush with the rivet head. Transducers and a process controller monitor the installation process and actuate the cut off blade upon determining that the blind rivet is properly installed.

20 Claims, 3 Drawing Sheets

METHOD FOR INSTALLATION OF BLIND RIVETS

FIELD OF THE INVENTION

The present invention relates to an improved method for blind riveting together a set of members.

BACKGROUND OF THE INVENTION

It is known to attach together a set of members using a blind rivet assembly. The use of a blind rivet to attach members together is particularly useful in the assembly or repair of vehicle bodies or other applications in which access can be obtained to only one side of one of the members (a top member), with the other member (a bottom member) being hidden and inaccessible below the top member.

The conventional blind rivet is comprised of a rivet body and a mandrel. The rivet body has a rivet head abutting the top member and a hollow shank reaching through aligned holes of the top and bottom members and having a terminal end. The mandrel includes a stem extending through the hollow shank of the rivet and a mandrel head adjacent the terminal end of the rivet shank. A tool installs the blind rivet by extracting the mandrel axially so that the mandrel head axially collapses and radially expands the hollow shank of the blind rivet into engagement with the bottom member. The mandrel typically has a weakened region to define a point on the mandrel where the mandrel fractures, either by twisting the tool or by applying axial force to exceed the tensile strength of the weakened region of the mandrel. Although it is desirable for strength and aesthetics to fracture the mandrel flush with the rivet head, variations in the thickness of the work piece and variations in the repeatability of the fracture of the mandrel stem render it difficult to consistently obtain a flush fracture of the mandrel stem.

It would be desirable to provide improvements in the blind rivet method of attaching members together, particularly improvements to make such attachments of higher strength and of greater reliability both in the installation process and the finished attachment.

SUMMARY OF THE INVENTION

Method and apparatus is provided for the attachment together of top and bottom members by the installation of a blind rivet of the type having a rivet head abutting the top member and a hollow shank reaching through aligned holes of the top and bottom members and having a terminal end, and a mandrel including a stem extending through the hollow shank of the rivet and a mandrel head adjacent the terminal end of the rivet shank. Tool housing has an anvil seated on the rivet head. A collet is reciprocable within the tool housing and carries jaws for gripping the mandrel. Retraction of the jaws by the collet displaces the jaws and the mandrel axially and causes the mandrel head to axially collapse and radially expand the hollow shank of the blind rivet into engagement with the bottom member so that the rivet attaches the top member and the bottom member and the mandrel is captured within the rivet shank by interference fit. A first transducer measures the axial load imposed on the mandrel and second transducer measures the axial displacement of the collet and the jaws and the mandrel. When the axial load and mandrel displacement confirm that the blind rivet has properly collapsed, a cut off tool, such as a blade, is actuated to cut off the mandrel flush with the rivet head and the tool is then removed.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

Figure 1:
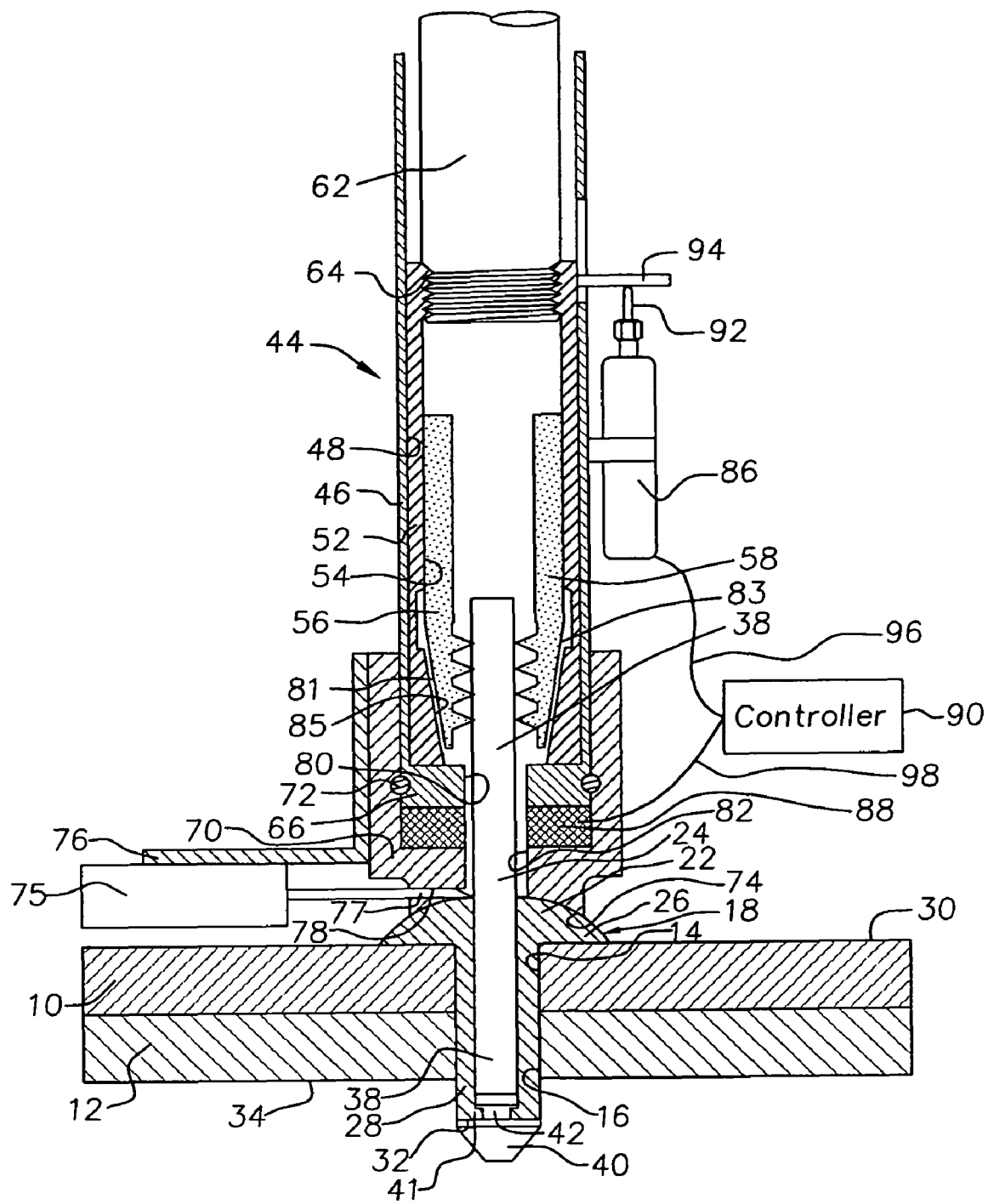
FIG. 1 is a section view through a top member and a bottom member that are to be attached together and showing a tool and monitoring system for installing a blind rivet seated in aligned holes in the members.

Referring to FIG. 1, a top member 10 is a sheet metal panel and a bottom member 12 is a sheet metal panel. The top member and the bottom member are to be attached together. If desired, one or more additional components or members may be stacked with the top and bottom members.

A hole 14 is drilled, pierced, or otherwise provided through the top member 10 and an aligned hole 16 is provided in the bottom member 12.

A blind rivet assembly 18 is inserted through the aligned holes 14 and 16. The blind rivet assembly 18 includes a blind rivet 22 and a mandrel 24.

The blind rivet 22 has a rivet head 26 and a hollow rivet shank 28 that are integrally formed in one piece. The rivet head 26 rests on the top face 30 of the top member 10. The hollow rivet shank 28 extends through the aligned holes 14 and 16 and is somewhat longer than the combined thickness of the top and bottom members 10 and 12 and has terminal end 32 that ends somewhat beyond the bottom face 34 of the bottom member 12.

The mandrel 24 includes a stem 38 that extends in tight fitting relationship through the blind rivet 22 and has an enlarged mandrel head 40 at its terminal end. As seen in FIG. 1, the mandrel 24 is longer than the length of the blind rivet 22 so that the stem 38 extends well above the rivet head 26 of the blind rivet 22. The mandrel head 40 is larger than the inner diameter of the hollow rivet shank 28 of the blind rivet 22, but smaller than the diameter of the aligned holes 14 and 16 so that the blind rivet assembly 18 can be inserted through the aligned holes 14 and 16. The lowermost end of the hollow rivet shank 28 is turned inwardly at shoulder 41, which seats within a necked down recess 42 provided in the mandrel stem 38 adjacent to the mandrel head.

Referring to FIG. 1, a blind rivet installation tool, generally indicated at 44 is used to install the blind rivet assembly 18. The tool includes a tubular tool housing 46 having a bore 48. A collet sleeve 52 is slideable within the bore 48 of tubular tool housing 46 and has a collet cavity 54. A plurality of jaws, two of which are shown as jaws 56 and 58, are carried within the collet cavity 54 of the collet sleeve 52.

The upper end of the collet sleeve 52 is attached to a drive shaft 62 by threads 64. The drive shaft 62 is connected to an operating mechanism, such as a pneumatic cylinder, hydraulic cylinder, electric motor, or the like, for forcibly reciprocating the collet sleeve 52 within the tubular tool housing 46.

The lower end of the collet sleeve 52 is partly closed by an end wall 66 that is normally engaged by the lower end of the collet sleeve 52 as shown in FIG. 1. An annular anvil housing 70 is seated on the lower end of the collet sleeve 52 and attached thereto by a retaining ring 72. The lower end of the anvil housing 70 forms an anvil surface 74 that is shaped to seat upon the rivet head 26 of the blind rivet 22.

FIG. 1 also shows a linear actuator 75 that is mounted on the annular anvil housing 70 by a mounting bracket 76. The linear actuator 75 drives a cut off blade 77 that slides within a slot 78 in the side of the annular anvil housing 70. The linear actuator 75 may be hydraulic, pneumatic, electrical, mechanical or some other actuating device for advancing and retracting the cut off blade 77.

As seen in FIG. 1, the lower end of the collet sleeve 52 has an aperture 85 that aligns with an aperture 82 in the annular anvil housing 70. These apertures 80 and 82 cooperate to receive the mandrel stem 38 when the installation tool 44 is lowered onto the blind rivet assembly 18 as shown in FIG. 1. In FIG. 1, the tool is shown with the anvil surface 74 pressed against the rivet head 26 and the jaws 56 and 58 poised against the mandrel stem 38 at the top of the rivet head 26. The cutoff blade 77 is poised adjacent to the mandrel stem 38 at the level at the top of the rivet head 26.

Figure 2:
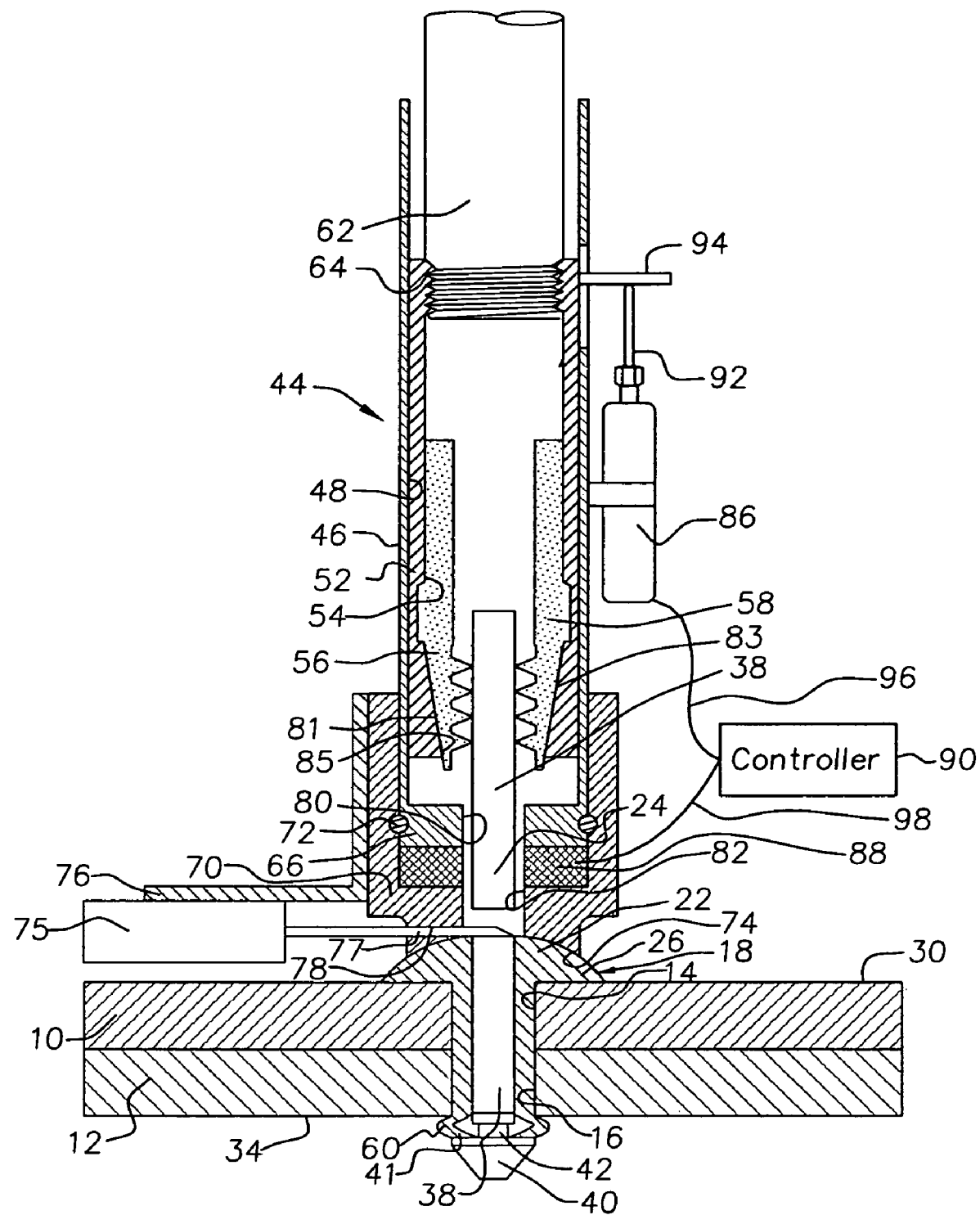
FIG. 2 is a view similar to FIG. 1 but showing actuation of the tool to install the blind rivet and cut off the blind rivet mandrel; and, FIG. 3 is a flow chart showing the installation process.

In FIG. 2, it is seen that the operating mechanism has been operated causing the drive shaft 62 to retract the collet sleeve 52 upwardly. The jaws 56 and 58 have cam surfaces 81 and 83 at their outer sides that bear upon a mating annular cam surface 85 of the collet sleeve 52. These cam surfaces act in manner to cause the jaws 56 and 58 to be lifted upwardly with the collet sleeve and also urge the jaws 56 and 58 inwardly to securely grip the mandrel stem 38 so that the mandrel stem 38 is lifted in unison with the collet sleeve 52, the jaws 56 and 58, and the drive shaft 62. It will be appreciated that the jaws 56 and 58 are shown with teeth that assure effective gripping of the mandrel stem 38. The mandrel stem 38 may also be provided with grooves, not shown, to further promote gripping by the jaws 56 and 58.

In FIG. 2, the jaws 56 and 58 have been forcibly withdrawn causing the mandrel stem 38 to have been drawn upwardly so that the mandrel head 40 has contacted the terminal end 32 of the rivet shank 28 and worked to axially collapse and radially expand the rivet shank 28 to form an expanded head 60 that engages with the underside 34 of the lower member 12. The lowermost end 41 of the rivet shank 28 remains captured within the necked down recess 42 of the mandrel stem 38. Thus, the top member 10 and the bottom member 12 are tightly captured between the rivet head 22 and the expanded head 60 of the rivet shank 28, thereby fastening together the top member 10 and the bottom member 12.

FIG. 2 also shows that the actuator mandrel stem 38 has been cut off by actuation of the linear actuator 75 to drive the cut off blade 77 through the mandrel stem 38 flush with the top of the rivet head 26. The mandrel stem 38 remains captured within the rivet shank 28 by the shoulder 41 of the rivet shank 28 being seated within the necked down recess 42 of the mandrel stem 38. In addition, the diameter of the mandrel stem 38 provides an interference fit within the hollow rivet shank 28 so that the mandrel stem contributes to the strength of the blind rivet connection.

A monitoring system for monitoring and controlling the installation tool includes a displacement sensor 86 that measures the displacement of the collet sleeve 52, a load cell washer 88 that measures the axial load imposed upon the mandrel stem 38, and an electronic controller 90.

More particularly, the displacement sensor 86 is preferably a linear variable differential transformer that is mounted on the tool housing 46 and has a spring loaded plunger 92 that follows an arm 94 that projects from the side of the collet sleeve 52. Alternatively the transducer 86 may be a commercially available optical displacement sensor. The transducer 86 is electrically connected to the electronic controller 90 by a cable 96.

The load cell washer 88 is interposed between the lower end of the tubular tool housing 46 and the anvil housing 70. It will be understood that as the jaws 56 and 58 and the collet sleeve 52 forcibly lift the mandrel stem 38 upwardly, there is an equal and opposite reaction force that is imposed upon the anvil housing 70 and is sensed by the load cell washer 88. The load cell washer 88 is connected to the electronic controller 90 by a cable 98.

Figure 3:
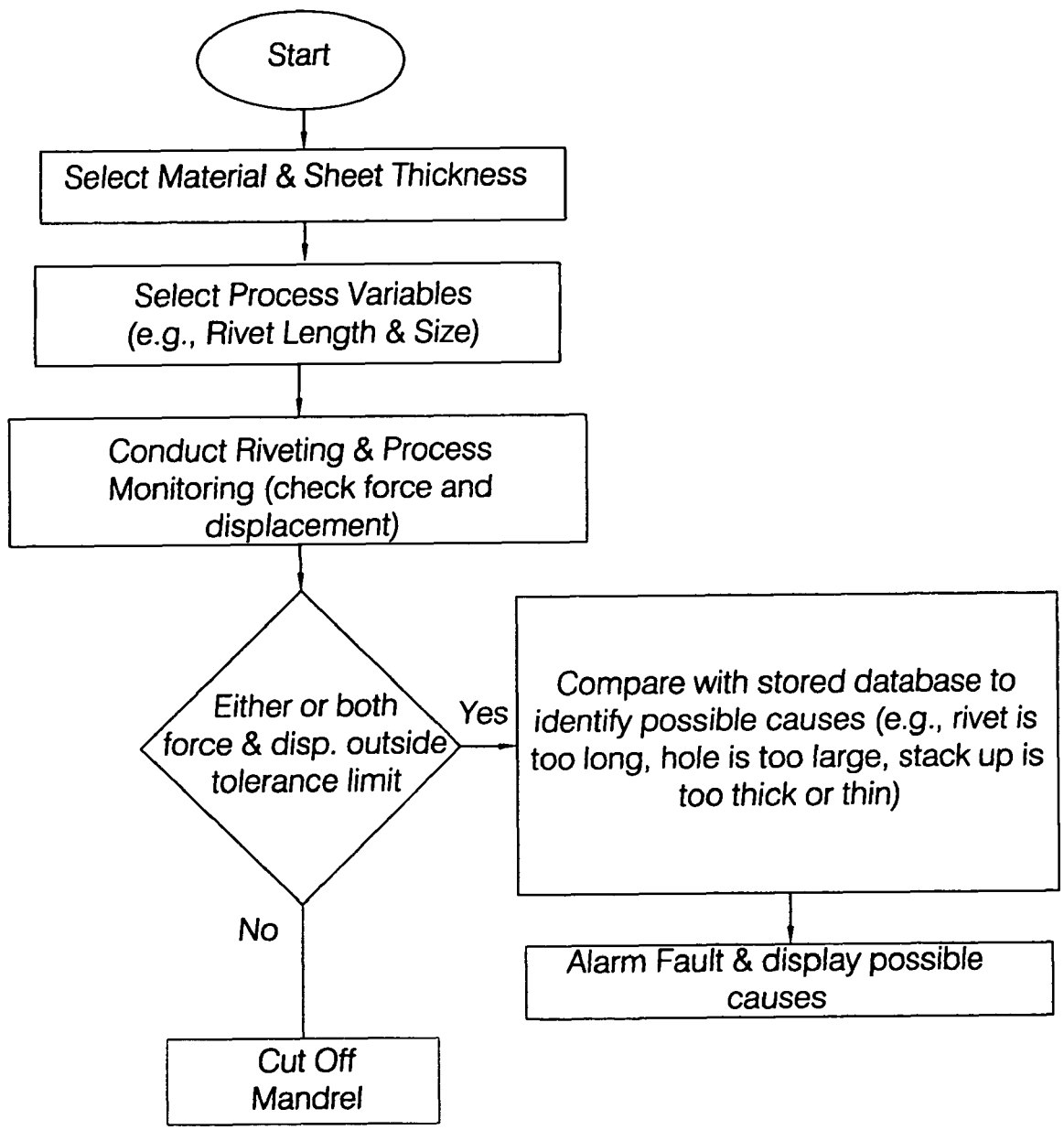

It will be understood and appreciated that the electronic controller 90 will monitor the mandrel displacement and axial force during the conduct of the blind rivet installation process, as shown in the flow chart of FIG. 3. In particular, the electronic controller 90 will determine that the magnitude of mandrel displacement and axial force is consistent with the full and proper axial collapse and radial expansion of the rivet shank 28, and then actuate the linear actuator 75 to advance the cut off blade 77 into the slot 78 and cut off the mandrel stem 38. This cut off can be activated while the axial force is being applied or after the axial force is released. In either case, the mandrel stem 38 will be severed flush with the rivet head 26. And the flush cut off will be obtained irrespective of any variation in the thickness of the members 10 and 12.

In addition, the electronic controller 90 may perform any of a number of monitoring and control functions. For example the monitoring system and process controller 90 may be reset to attach together different thicknesses of material stackup. The monitoring system may simply provide reports and fault alarms as shown in the flow chart. Or the process controller 90 may initiate automatic adjustment of the stroke and force of the collet sleeve in the event that the process is operating outside the normal control limits for any of the monitored conditions. The disclosure of U.S. patent application Ser. No. 11/341,539, filed Jan. 27, 2006 entitled "Method for Monitoring the Installation of Blind Rivets" provides further description of the monitoring system and is hereby incorporated by reference.

The foregoing process provides a blind fastener installation that is of high strength. In particular, the cut off of the mandrel stem 38 flush with the rivet head 26, and the retention of the mandrel stem 38 within the rivet shank 28, and the interference fit between the mandrel stem 38 and the rivet shank all contribute to a reliable and high strength fastener installation.

It will be understood that the foregoing description of the invention is merely exemplary in nature and, thus, variations thereof are intended to be within the scope of the invention. For example, the drawings show sensors for sensing both displacement and force. However, it may be found useful to monitor either one of these conditions, without the other. In addition, other known displacement transducers and force measuring transducers may be substituted for those specifically described herein. Furthermore, although the drawings show the load cell as associated with the anvil, it may be desirable to mount the load cell with the drive shaft or the collet sleeve to measure the force applied to the mandrel by the installation tool.

And although the drawings show only a top member and bottom member being attached by the blind rivet, the monitoring system of this invention can also be used when three or more members or components are stacked together. In addition, the present invention can be employed in conjunction with blind rivets that are installed via the friction stir blind rivet method of U.S. patent application 2006/0024145, published Feb. 2, 2006, entitled "Friction Stir Rivet and Method of Joining Therewith", the disclosure of which is hereby incorporated by reference.

Although the drawings show a single cut off blade 77, it may be desirable to have two or more blades that approach the mandrel stem 38 from opposite sides. In addition, the blade 77 need not fully sever the mandrel stem 38, but rather the blade 77 may cut into the mandrel stem 38, sufficiently to weaken the mandrel stem 38 so that the force axial force applied by the installation tool will snap the mandrel stem 38 cleanly at the blade cut.

Furthermore, although the drawing shows the cut off tool as being a blade 77, it will be understood that the cut off tool may be an abrasive disc on a rotary motor, a rotary saw blade, a reciprocating saw blade, a pair of shears, or any other conventional cutting device known in the prior art. If the cut off tool creates metal chips or dust, a vacuum may be incorporated in the tool to suction the chips or dust.

Although the drawings show a blind rivet fastener of the type having an in-turned shoulder 41 seated within a necked down recess 42 of the mandrel stem 38 to retain the mandrel within the hollow rivet shank 28, the invention is also applicable to blind rivets where the mandrel is held in place within the shank by friction, or knurls, or other techniques.

What is claimed is:

1. A method of attaching together a pair of members by the installation of a blind rivet of the type having a rivet head abutting one of the members and a hollow shank reaching through aligned holes of the members and having a terminal end, and a mandrel including a stem extending through the hollow shank of the blind rivet and a mandrel head adjacent the terminal end of the rivet shank; comprising:
    gripping the mandrel and displacing the mandrel axially to axially load the mandrel and cause the mandrel head to axially collapse and radially expand the hollow shank of the blind rivet into engagement with the other of the members so that the blind rivet attaches the members together;
    and cutting off the mandrel flush with the rivet head; said cutting off of the mandrel being performed by a cut off blade mounted in a tool housing having an anvil seated on the rivet head to cut off the mandrel stem flush with the rivet head.

2. The method of claim 1 further comprising monitoring the installation of the blind rivet by at least one transducer and a process controller, and cutting off the mandrel upon the process controller determining that the blind rivet has been properly installed.

3. The method of claim 1 further comprising monitoring the installation process via at least one of a first transducer for measuring the axial load imposed on the mandrel and a second transducer for measuring the axial displacement of the mandrel.

4. The method of claim 1 in which upon installation of the blind rivet and cut off of the mandrel, a portion of the mandrel extending from the mandrel head to the rivet head remains captured by interference fit within the hollow shank of the rivet.

5. The method of claim 1 further comprising monitoring the installation of the blind rivet by at least one transducer and a process controller, cutting off the mandrel upon the process controller determining that the blind rivet has fully installed, and capturing a portion of the mandrel extending from the mandrel head to the rivet head within the hollow shank of the blind rivet by interference fit between the mandrel stem and the hollow shank.

6. A method of providing the high strength attachment together of a set of stacked members by the installation of a blind rivet of the type having a rivet head abutting a top member and a hollow shank reaching through aligned holes of the members and having a terminal end projecting beyond a bottom member, and a mandrel including a stem extending through the hollow shank of the rivet and a mandrel head adjacent the terminal end of the rivet shank; comprising:
    forcibly displacing the mandrel axially to cause the mandrel head to axially collapse and radially expand the hollow shank of the blind rivet into engagement with the bottom member so that the rivet attaches the members together;
    monitoring the installation of the blind rivet by at least one transducer and a process controller;
    and cutting off the mandrel in response to the process controller determining that the blind rivet has been properly installed.

7. The method of claim 6 in which upon installation of the blind rivet and cut off of the mandrel, a portion of the mandrel extending from the mandrel head to the rivet head remains captured within the hollow shank of the rivet so that the mandrel contributes to the strength of the attachment.

8. The method of claim 6 in which the cutting off of the mandrel is performed by a cut off tool that cuts the mandrel flush with the rivet head irrespective of any variation in the thickness of the stacked members.

9. The method of claim 8 in which the cut off tool is one of a blade, a saw, an abrasive disk or shears.

10. The method of claim 6 in which the cutting off of the mandrel is performed by a cut off tool that cuts the mandrel flush with the rivet head irrespective of any variation in the thickness of the stacked members so that the portion of the mandrel extending from the mandrel head to the rivet head remains captured by interference fit within the hollow shank of the rivet whereby the mandrel contributes to the strength of the attachment.

11. The method of claim 6 in which the cutting off of the mandrel is by a cut off tool having a tool housing with an anvil seated on the rivet head and the mandrel is cut off flush with the rivet head.

12. The method of claim 11 in which the at least one transducer and the process controller monitor the installation of the blind rivet and control the cut off tool to cut off the mandrel after sensing the completed installation of the blind rivet.

13. The method of claim 11 in which the cut off tool is a cut off blade slidably mounted within a slot provided in the tool housing adjacent the rivet head and is actuated by a linear actuator to cut off the mandrel flush with the rivet head.

14. The method of claim 13 in which the cut off tool cuts the mandrel flush with the rivet head irrespective of any variation in the thickness of the stacked members so that the portion of the mandrel extending from the mandrel head to the rivet head remains captured by interference fit within the hollow shank of the rivet whereby the mandrel contributes to the strength of the attachment.

15. The method of claim 14 in which the at least one transducer includes a first transducer for measuring an axial load imposed on the mandrel during the forcible displacement of the mandrel and a second transducer for measuring the axial displacement of the mandrel during the forcible displacement of the mandrel.

16. The method of claim 15 in which the first tranducer is a force transducer comprised of a load cell and the second tranducer is a linear variable differential transformer or an optical displacement sensor.

17. The method of claim 6 in which the at least one transducer includes a first transducer for measuring an axial load imposed on the mandrel during the forcible displacement of the mandrel, and a second transducer for measuring the axial displacement of the mandrel during the forcible displacement of the mandrel.

18. The method of claim 17 in which the first tranducer is a force transducer comprised of a load cell.

19. The method of claim 17 in which the forcible displacement of the mandrel is performed by a collet and jaws that grip the mandrel and the second tranducer is a linear variable differential transformer or an optical displacement sensor that measures the axial displacement of the mandrel by measuring the axial displacement of the collet and jaws.

20. The method of claim 17 in which the forcible displacement of the mandrel is performed by a collet and jaws that grip the mandrel and the second tranducer measures the axial displacement of the mandrel by measuring the axial displacement of the collet and jaws.

* * * * *